(12) United States Patent
Park

(10) Patent No.: US 10,843,424 B2
(45) Date of Patent: Nov. 24, 2020

(54) LENS INJECTION MOLDED PRODUCT TO WHICH HOT RUNNER IS APPLIED

(71) Applicant: Foundation For Research And Business, Seoul National University Of Science And Technology, Seoul (KR)

(72) Inventor: Keun Park, Seoul (KR)

(73) Assignee: FOUNDATION FOR RESEARCH AND BUSINESS, SEOUL NATIONAL UNIVERSITY OF SCIENCE AND TECHNOLOGY (KR)

( * ) Notice: Subject to any disclaimer, the term of this patent is extended or adjusted under 35 U.S.C. 154(b) by 155 days.

(21) Appl. No.: 16/079,619

(22) PCT Filed: Dec. 1, 2016

(86) PCT No.: PCT/KR2016/014054
§ 371 (c)(1),
(2) Date: Nov. 29, 2018

(87) PCT Pub. No.: WO2017/146358
PCT Pub. Date: Aug. 31, 2017

(65) Prior Publication Data
US 2019/0152175 A1    May 23, 2019

(30) Foreign Application Priority Data

Feb. 26, 2016  (KR) .......................... 10-2016-0022963

(51) Int. Cl.
*B29C 45/27*     (2006.01)
*B29C 45/17*     (2006.01)
(Continued)

(52) U.S. Cl.
CPC ...... *B29D 11/0048* (2013.01); *B29C 45/2708* (2013.01); *B29D 11/00* (2013.01);
(Continued)

(58) Field of Classification Search
CPC .......... B29C 2045/273; B29C 45/2725; B29C 45/2756; B29C 45/322; B29C 45/32;
(Continued)

(56) References Cited

U.S. PATENT DOCUMENTS 2,327,665 A * 8/1943 Peat .................... B29C 45/2618
249/59
2,483,094 A * 9/1949 Harvey .................. B29C 45/40
249/68
(Continued)

FOREIGN PATENT DOCUMENTS

JP  2005-161849   6/2005
JP  2008-185727   8/2008
(Continued)

OTHER PUBLICATIONS

International Search Report for Corresponding Application No. PCT/KR2016/014054. WO

*Primary Examiner* — Xiao S Zhao
*Assistant Examiner* — Emmanuel S Luk
(74) *Attorney, Agent, or Firm* — The Belles Group, P.C.

(57) ABSTRACT

An injection molded lens, to which the hot runner according to an embodiment of the present invention includes: a primary sprue; a primary runner which has a central portion connected to the primary sprue and an extension portion extending radially from the central portion; a secondary sprue of which one end is connected to the extension portion of the primary runner; a secondary runner which has a top thereof connected to the other end of the secondary sprue, has an annular shape and a thin plate shape, and has a
(Continued)

plurality of protrusions formed on an outer circumference thereof; a plurality of gates which are connected to ends of the plurality of protrusions of the secondary runner; and a plurality of cavities connected to the plurality of gates.

An injection molded lens, to which the hot runner according to another embodiment of the present invention includes: a primary sprue; a primary runner which has a central portion connected to the primary sprue and an extension portion extending radially from the central portion; a secondary sprue of which one end is connected to the extension portion of the primary runner; a secondary runner which has a top thereof connected to the other end of the secondary sprue, has a polygonal shape and a thin plate shape, and has a plurality of protrusions formed on an outer circumference thereof; a plurality of gates which are connected to ends of the plurality of protrusions of the secondary runner; and a plurality of cavities connected to the plurality of gates.

12 Claims, 10 Drawing Sheets

(51) Int. Cl.
  B29D 11/00 (2006.01)
  B29C 45/00 (2006.01)
  B29L 11/00 (2006.01)
(52) U.S. Cl.
  CPC .............. *B29C 2045/2709* (2013.01); *B29L 2011/0041* (2013.01)
(58) Field of Classification Search
  CPC ........ B29C 45/2701; B29C 2045/0094; B29C 2045/0086; B29C 2045/2709; B29D 11/00538; B29D 11/0048
  See application file for complete search history.

(56) References Cited

U.S. PATENT DOCUMENTS

| | | | | | |
|---|---|---|---|---|---|
| 3,172,588 | A * | 3/1965 | Bertold | ............... | B29C 45/382 225/93 |
| 3,533,594 | A * | 10/1970 | Segmuller | ........... | B29C 45/2725 249/107 |
| 3,559,249 | A * | 2/1971 | Patton | ................ | B29C 45/2628 425/567 |
| 3,819,312 | A * | 6/1974 | Arpajian | ................ | B29C 45/26 425/543 |
| 4,254,065 | A * | 3/1981 | Ratkowski | .............. | B29C 45/00 264/2.5 |
| 4,277,434 | A * | 7/1981 | Conway | .............. | B29C 45/2616 24/598.2 |
| 4,360,330 | A * | 11/1982 | McFarlane | ........ | B29C 45/14336 425/122 |
| 4,723,898 | A * | 2/1988 | Tsutsumi | ................ | B29C 45/02 264/328.15 |
| 4,752,199 | A * | 6/1988 | Arai | ................... | B29C 45/1603 264/328.12 |
| 4,826,424 | A * | 5/1989 | Arai | ................... | B29C 45/1642 264/328.8 |
| 4,840,553 | A * | 6/1989 | Arai | ................... | B29C 45/1603 264/255 |
| 4,900,560 | A * | 2/1990 | Trakas | ............... | B29C 45/2735 264/297.2 |
| 5,069,615 | A * | 12/1991 | Schad | ..................... | B29C 45/27 264/297.2 |
| 5,071,334 | A * | 12/1991 | Obara | ..................... | B29C 45/02 425/116 |
| 5,539,971 | A * | 7/1996 | Kelly | .................. | A61B 1/0011 264/1.1 |
| 5,641,526 | A * | 6/1997 | Gellert | .................... | B29C 45/27 264/328.8 |
| 5,718,849 | A * | 2/1998 | Maus | .................. | B29C 45/1769 264/2.2 |
| 6,231,800 | B1 * | 5/2001 | Togashi | .............. | B29C 45/2756 264/328.16 |
| 6,561,782 | B1 * | 5/2003 | Umemoto | ........ | B29C 45/14655 264/272.17 |
| 7,525,742 | B2 * | 4/2009 | Yamazaki | ........... | B29C 45/2708 359/811 |
| 7,806,607 | B2 | 10/2010 | Iyoda et al. | | |
| 7,857,615 | B2 * | 12/2010 | Zha | ..................... | B29C 45/2704 264/328.12 |
| 8,241,032 | B2 * | 8/2012 | Klobucar | ............ | B29C 45/2703 425/570 |
| 8,476,551 | B2 * | 7/2013 | Tung | .................. | B23K 26/0823 219/121.67 |
| 8,490,676 | B2 * | 7/2013 | Shibata | .................. | B22D 17/22 164/312 |
| 8,589,134 | B2 * | 11/2013 | Tisne | .................. | B29C 33/3835 703/9 |
| 9,925,705 | B2 * | 3/2018 | Otsuka | .................... | B29C 45/36 |
| 2003/0185931 | A1 * | 10/2003 | Vanast | ................ | B29C 45/2756 425/572 |
| 2006/0093700 | A1 * | 5/2006 | Naito | ............... | B29D 11/00413 425/542 |
| 2006/0237871 | A1 * | 10/2006 | Uchida | ............. | B29C 45/14467 264/275 |
| 2007/0221237 | A1 * | 9/2007 | Kim | ........................ | A45D 31/00 132/73 |
| 2009/0239038 | A1 * | 9/2009 | Nagashima | ......... | B29C 45/0046 428/156 |
| 2009/0246312 | A1 * | 10/2009 | Xiao | .................... | B29C 33/0066 425/552 |
| 2010/0025869 | A1 * | 2/2010 | Suzuishi | ............. | B29C 45/0025 264/1.1 |
| 2010/0258975 | A1 * | 10/2010 | Goda | .................. | B29C 45/2602 264/272.21 |
| 2010/0295216 | A1 * | 11/2010 | Shin | .................... | B29C 45/2602 264/328.15 |
| 2011/0123668 | A1 * | 5/2011 | Budapanahalli | .... | B29C 45/2727 425/573 |
| 2011/0258896 | A1 * | 10/2011 | Watson | ............. | B29C 45/14836 40/664 |
| 2012/0193821 | A1 * | 8/2012 | Takunni | .................. | B29C 43/34 264/2.4 |
| 2013/0148208 | A1 * | 6/2013 | Yang | ..................... | G02B 7/022 359/642 |
| 2016/0129649 | A1 * | 5/2016 | Otsuka | ............ | B29D 11/00432 264/1.1 |
| 2019/0054673 | A1 * | 2/2019 | Kuramoto | ........... | B29C 45/0046 |

FOREIGN PATENT DOCUMENTS

| | | |
|---|---|---|
| JP | 2008-213179 | 9/2008 |
| JP | 2010-194780 A | 9/2010 |
| JP | 2013-204122 A | 10/2013 |

\* cited by examiner

[Fig. 1]                                                PRIOR ART
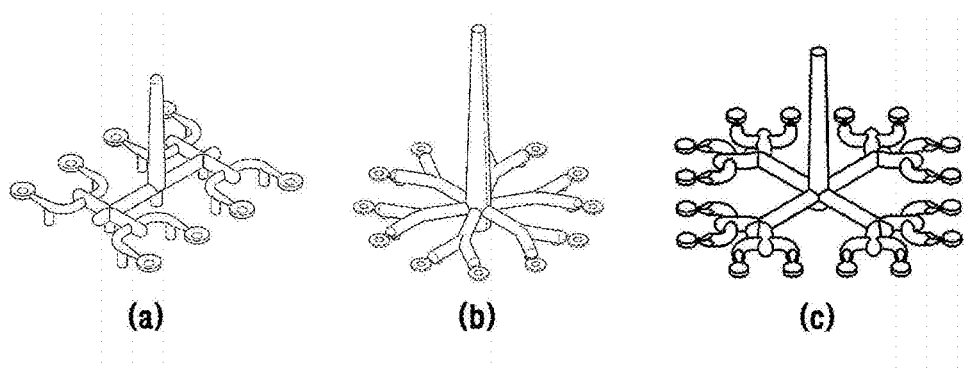
(a)          (b)          (c)
[Fig. 2]
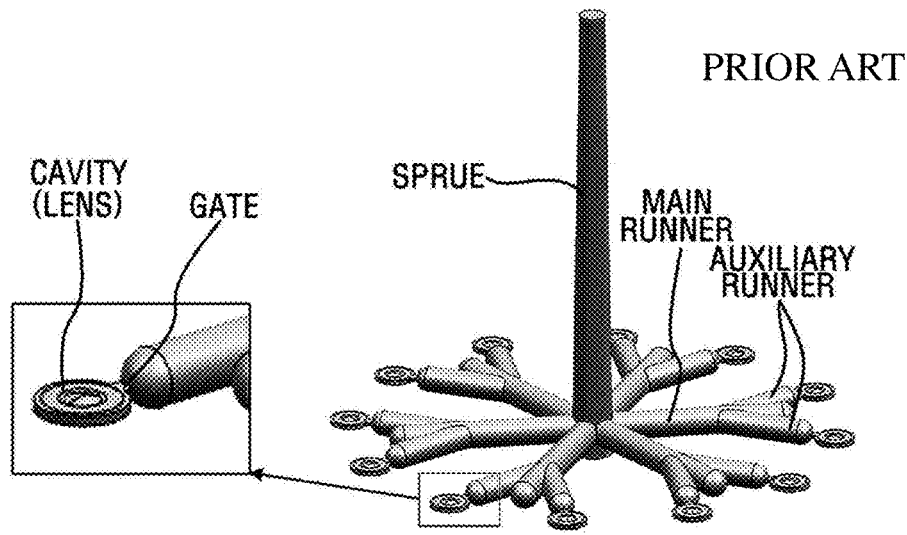
PRIOR ART

[Fig. 3]
PRIOR ART
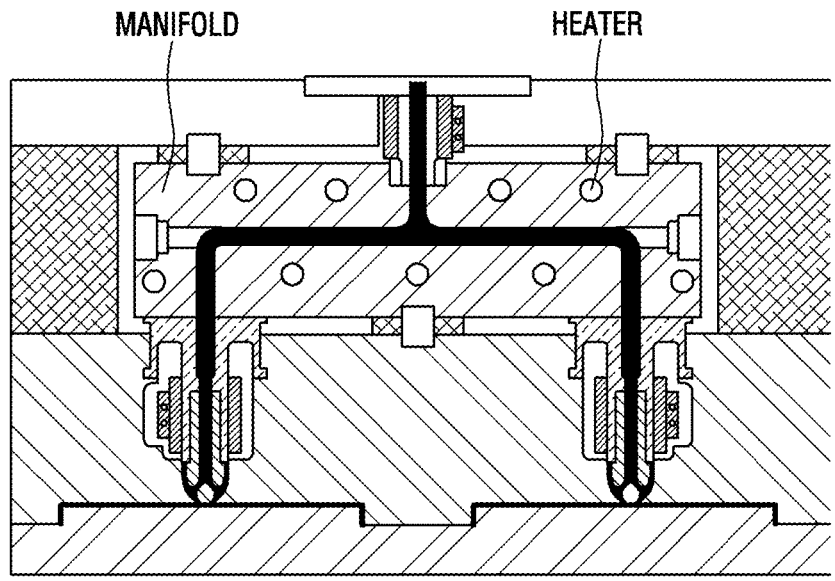
[Fig. 4]
PRIOR ART
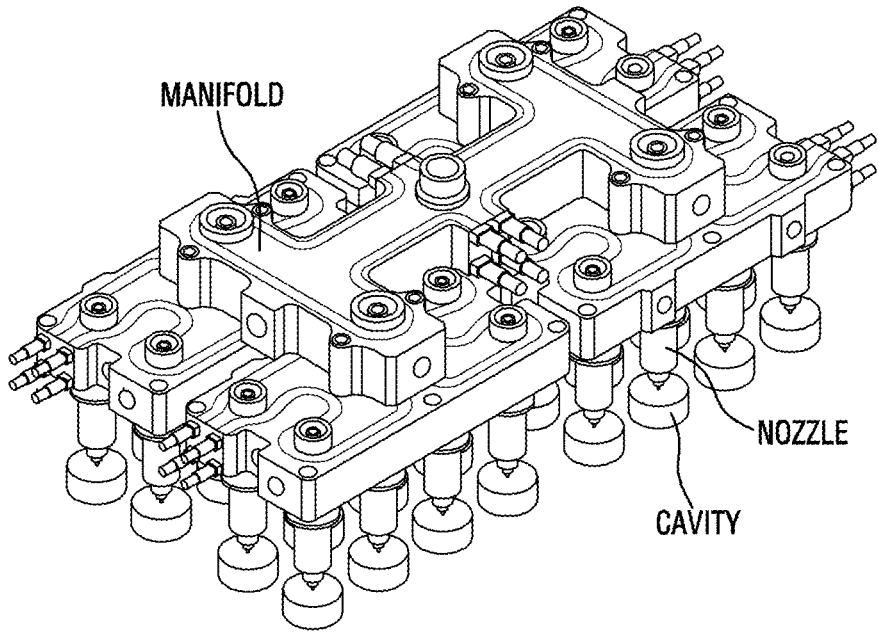

[Fig. 5]
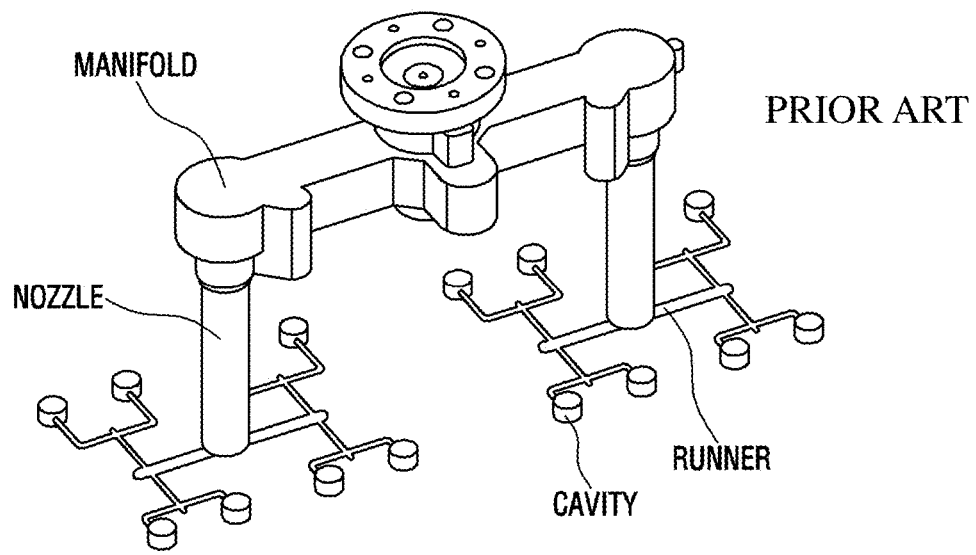
PRIOR ART
[Fig. 6]
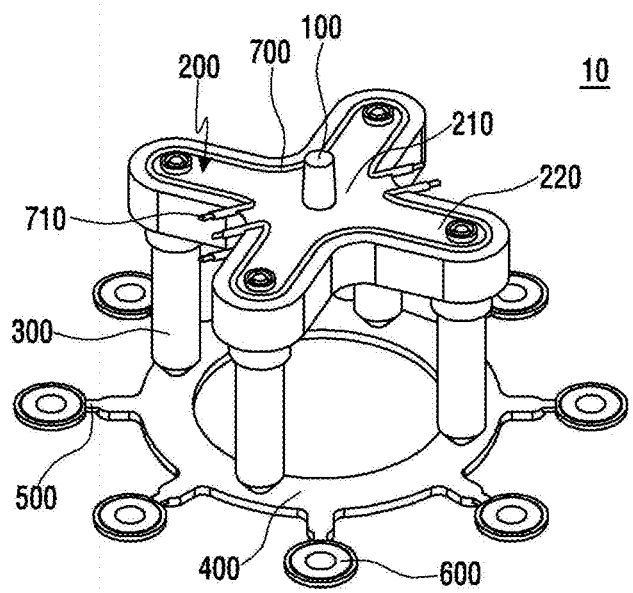

[Fig. 7]
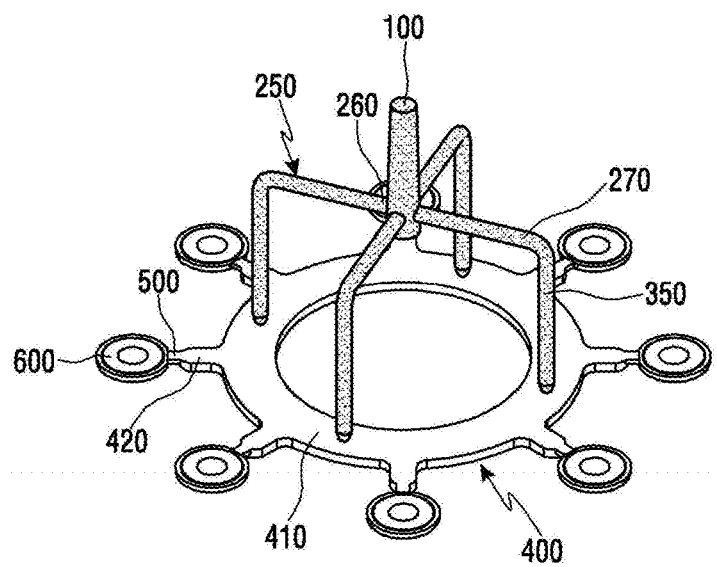
[Fig. 8]
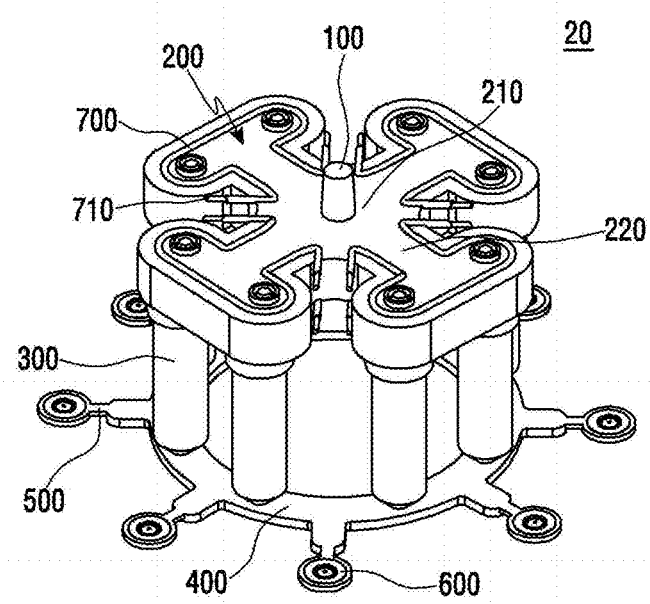

[Fig. 9]
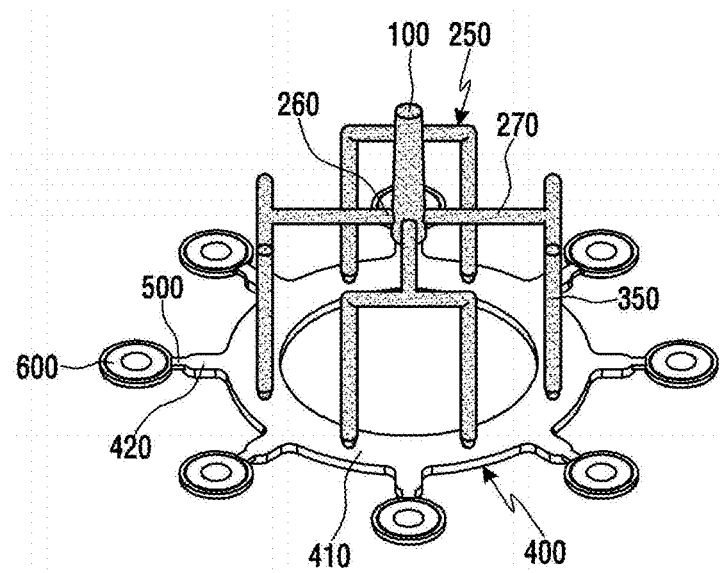
[Fig. 10]
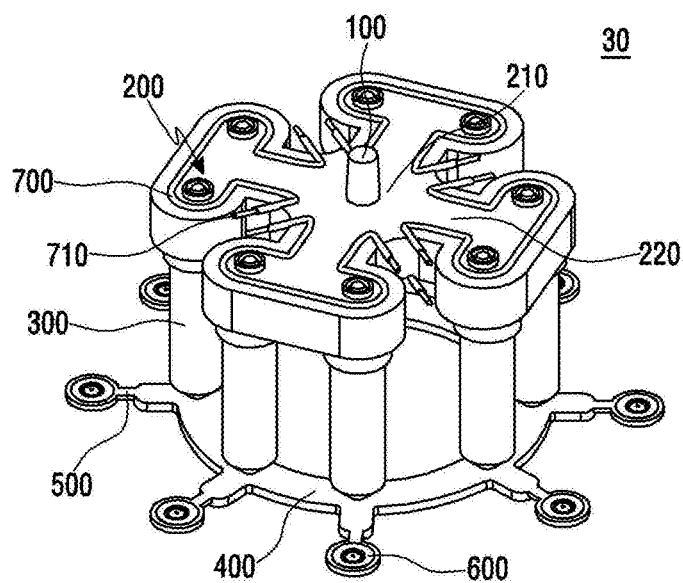

[Fig. 11]
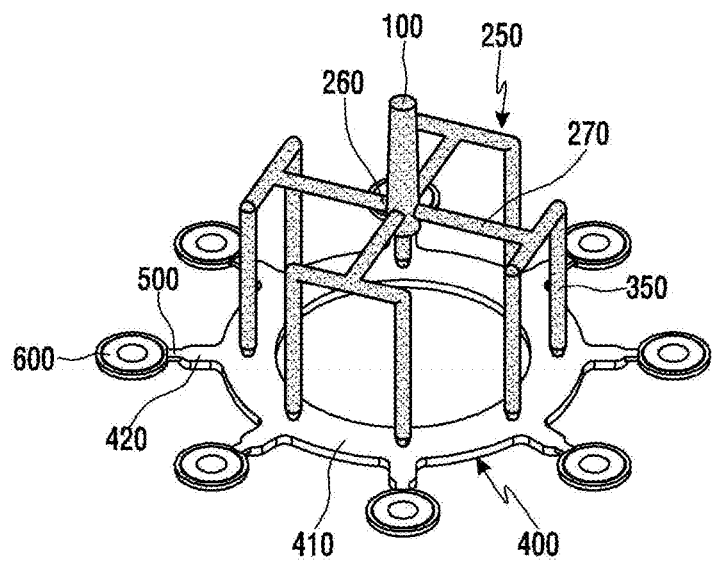

[Fig. 12]
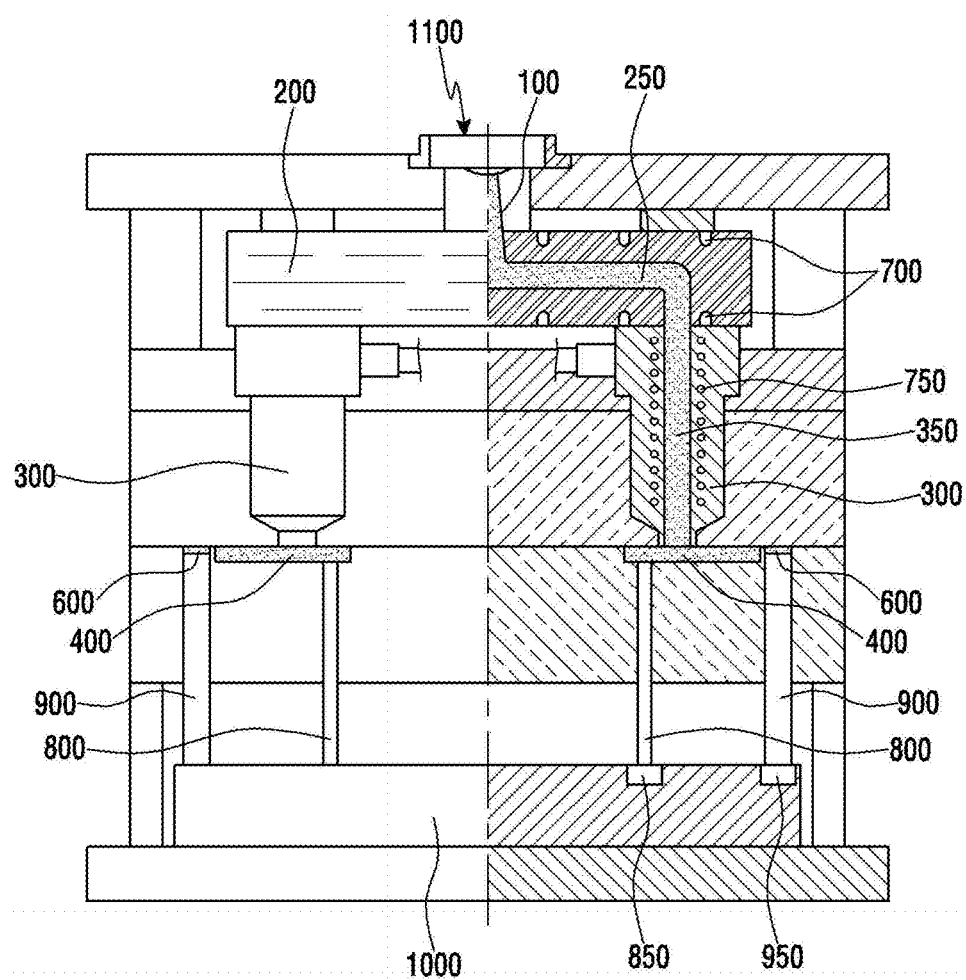

[Fig. 13]
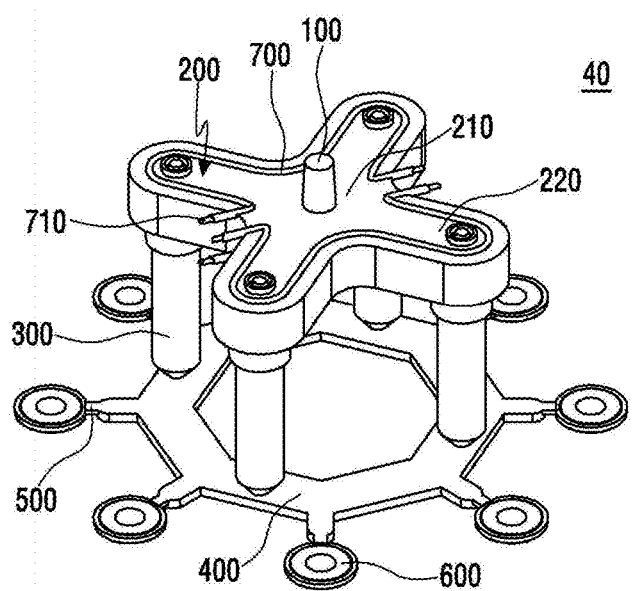
[Fig. 14]
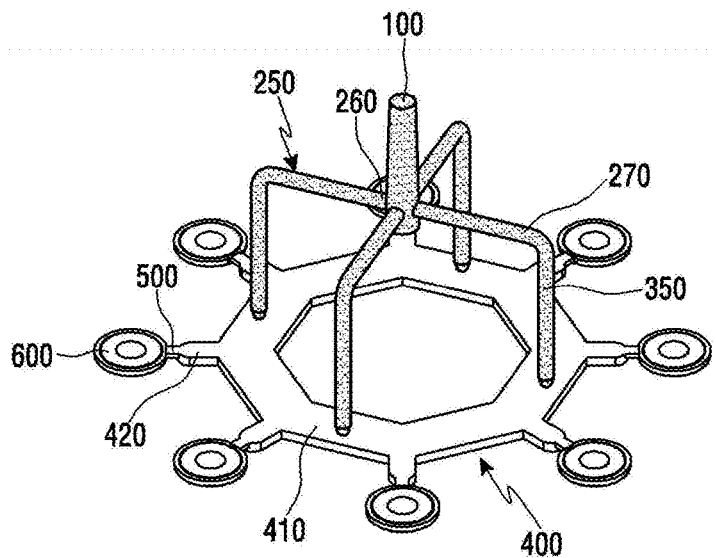

[Fig. 15]
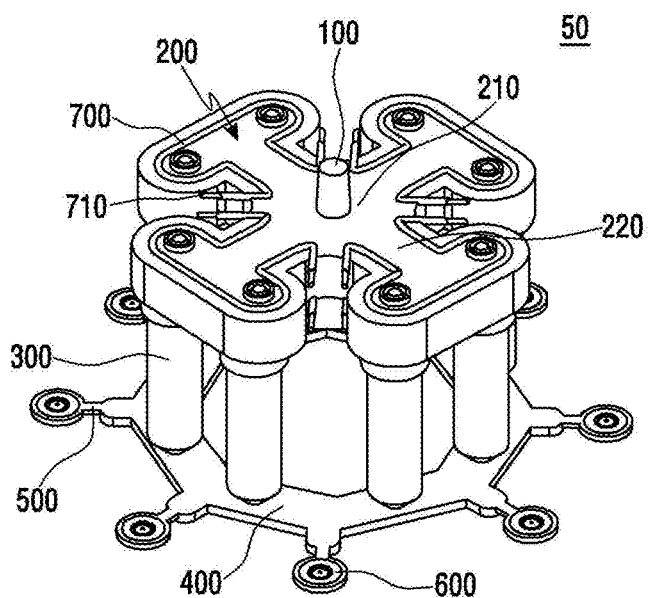
[Fig. 16]
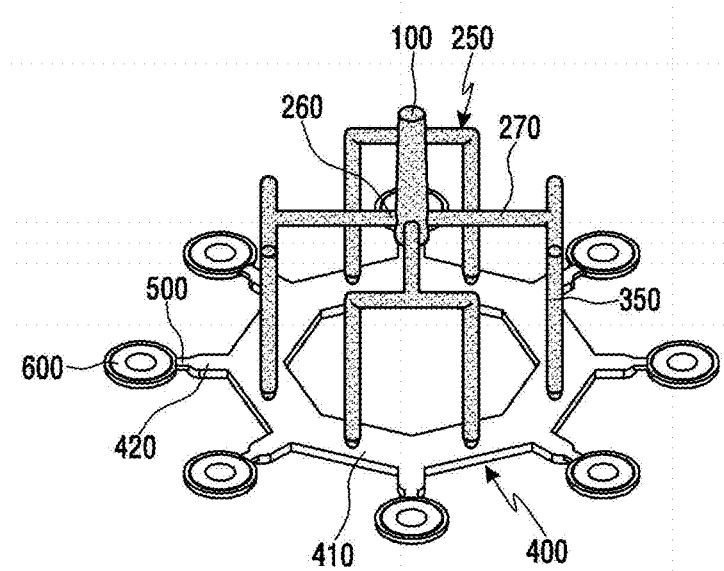

[Fig. 17]
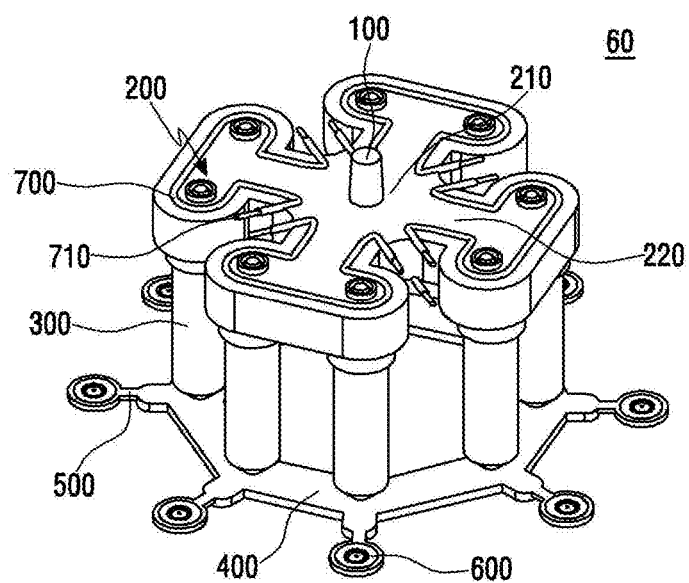
[Fig. 18]
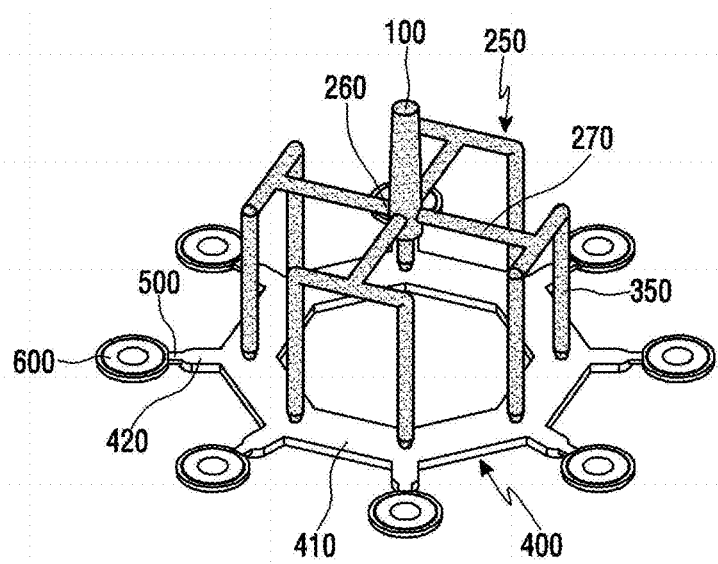

LENS INJECTION MOLDED PRODUCT TO WHICH HOT RUNNER IS APPLIED

CROSS-REFERENCE TO RELATED PATENT APPLICATIONS

The present application is a U.S. national stage application under 35 U.S.C. § 371 of PCT Application No. PCT/KR2016/014054, filed Dec. 1, 2016, which claims priority to Korean Patent Application No. 10-2016-0022963, filed Feb. 26, 2016. The disclosures of the aforementioned priority applications are incorporated herein by reference in their entireties.

TECHNICAL FIELD

The present disclosure relates to an injection molded lens to which a hot runner is applied.

BACKGROUND ART

Recently, the performance of a mobile phone camera has been rapidly advanced and is now replacing the existing digital camera market. With the performance advancement of a camera module, a technology for improving the performance of the optical system is required. At present, five aspheric lenses are assembled for 130 million pixels, and six aspheric lenses are assembled for 160 million pixels.

Meanwhile, since a smartphone becomes gradually thinner, a great number of subminiature lenses (diameter less than 5 mm, thickness less than 0.5 mm) should be arranged in a small space. Therefore, the lens is formed gradually thinner. However, such a thin lens has much difficulties due to the increase of the flow resistance during the molding thereof.

The lens of the mobile phone camera is produced by using injection molding, and, in general, for the purpose of producing multi-cavity (8 to 16 cavities), a two-plate mold is manufactured and applied to the production process. Regarding multi-cavity injection molding, generally, a mold is manufactured in such a manner as to achieve flow balance among cavities by employing a runner structure including an H-type shown in (a) of FIG. 1, a radial type shown in (b) of FIG. 1, a mixed type shown in (c) of FIG. 1, etc.

A delivery system is required, which leads from a resin injection point to the cavity (lens) during injection molding. The delivery system is generally composed in the order of a sprue, a runner, and a gate. The delivery system is separated from the product and is discarded after injection molding. Regarding a subminiature lens injection molding, unlike typical injection molding, the volume of the delivery system is much greater than that of a molded product (lens), so that the material thereof is heavily consumed.

Referring to FIG. 2, a cylindrical runner is generally used in a conventional injection molding of subminiature lens. In consideration of the flow resistance in the runner portion, a main runner and an auxiliary runner which have a 2 mm or more diameter are generally used. Therefore, during the molding of a thin lens having a 0.5 mm or less thickness, the runner is not sufficiently solidified even though the lens is solidified. As a result, additional cooling time is required, thereby deteriorating the productivity.

During the injection molding, the sprue and the runner which correspond to the delivery system of the molten polymer are separated from the product and are discarded after the molding. In response to this, a hot runner is used with the intention of improving the use efficiency of the material and of reducing the cooling time by maintaining the sprue and the runner in a molten state during the molding.

Regarding a hot runner injection mold, manifold is, as shown in FIG. 3, installed within the mold, and the primary sprue, the runner, and the secondary sprue are heated and maintained in a molten state. In the hot runner injection, it is common that the product is, as shown in FIG. 4, directly installed at the lower portion of the secondary sprue surrounded by the heating nozzles. However, the lens is difficult to be molded in such a way due to the limitation that the gate cannot be located on the lens surface (only the side gate can be).

In addition, U.S. Patent Application Publication No. US2014-0377401 discloses a structure in which only the sprue is maintained in a molten state and the cylindrical runner is installed at a lower portion of the sprue as a cold runner that should be solidified during the cooling stage. Thus, the cooling problem of the cylindrical runner is still unsolved.

Therefore, in the application of the multi-cavity hot runner structure to a conventional two-plate mold with side gates, the hot runner structure is, as shown in FIG. 5, limitedly applied only to the primary runner located within the manifold and the secondary sprue located within the nozzle and cannot be applied to the secondary runner portion connected to the lower portion of the secondary sprue. As a result, the efficiency of the hot runner is deteriorated and the cooling time of the runner portion cannot be reduced significantly. It is preferable that a three-plate mold with pinpoint gates is applied to efficiently apply the hot runner. However, such a mold structure cannot be applied to the lens molding because a gate mark on the lens surface is not allowed. Therefore, an alternative mold structure to solve this limitation is required.

Accordingly, there is a requirement for an injection mold for a subminiature lens, which is different from existing structures, overcomes the inefficiency such as the cooling problem of the cylindrical runner, and can be applied to the hot runner.

DISCLOSURE

Technical Problem

The object of the present invention is to provide an injection molded subminiature lens to which a hot runner is applied, which is capable of reducing cooling time of the runner portion.

Technical Solution

One embodiment is an injection molded lens to which a hot runner structure is applied. The injection molded lens includes: a primary sprue; a primary runner which has a central portion connected to the primary sprue and an extension portion extending radially from the central portion; a secondary sprue of which one end is connected to the extension portion of the primary runner; a secondary runner which has a top thereof connected to the other end of the secondary sprue, has an annular shape and a thin plate shape, and has a plurality of protrusions formed on an outer circumference thereof; a plurality of side gates which are connected to ends of the plurality of protrusions of the secondary runner; and a plurality of cavities connected to the plurality of gates.

The primary sprue, the primary runner, and the secondary sprue may be hot runner portions which are maintained in a molten state, and the secondary runner and the gate may be cold runner portions.

The number of the extension portions of the primary runner may be ½ of the number of the cavities. The other end of the secondary sprue may be located at every second point between two adjacent cavities of the plurality of cavities.

The number of the extension portions of the primary runner may be ½ of the number of the cavities. An end of the extension portion of the primary runner may branch in both directions and may have two sub-ends. One end of the secondary sprue may be connected to the sub-end. The other end of the secondary sprue may be located between two adjacent cavities of the plurality of cavities.

The number of the extension portions of the primary runner may be ½ of the number of the cavities. An end of the extension portion of the primary runner may branch in both directions and may have two sub-ends. One end of the secondary sprue may be connected to the sub-end. The other end of the secondary sprue may be positioned corresponding closely to each of the cavities.

Another embodiment is an injection molded lens, to which the hot runner according to another embodiment of the present invention. The injection molded lens includes: a primary sprue; a primary runner which has a central portion connected to the primary sprue and an extension portion extending radially from the central portion; a secondary sprue of which one end is connected to the extension portion of the primary runner; a secondary runner which has a top thereof connected to the other end of the secondary sprue, has a polygonal shape and a thin plate shape, and has a plurality of protrusions formed on an outer circumference thereof; a plurality of gates which are connected to ends of the plurality of protrusions of the secondary runner; and a plurality of cavities connected to the plurality of gates.

The primary sprue, the primary runner, and the secondary sprue may be hot runner portions which are maintained in a molten state, and the secondary runner and the gate may be cold runner portions.

The number of the extension portions of the primary runner may be ½ of the number of the cavities. The other end of the secondary sprue may be located at every second point between two adjacent cavities of the plurality of cavities.

The number of the extension portions of the primary runner may be ½ of the number of the cavities. An end of the extension portion of the primary runner may branch in both directions and may have two sub-ends. One end of the secondary sprue may be connected to the sub-end. The other end of the secondary sprue may be located between two adjacent cavities of the plurality of cavities.

The number of the extension portions of the primary runner may be ½ of the number of the cavities. An end of the extension portion of the primary runner may branch in both directions and may have two sub-ends. One end of the secondary sprue may be connected to the sub-end. The other end of the secondary sprue may be positioned corresponding closely to each of the cavities.

Advantageous Effects

Since the secondary runner has an annular shape or a polygonal shape and a thin plate shape, the injection molded lens, to which the hot runner according to the embodiment of the present invention has been applied can reduce the material consumption as compared with the conventional cylindrical runner and can shorten the cooling time required for the runner to be solidified. As a result, additional cooling time after the completion of solidification of the lens is reduced, so that the productivity can be further improved than the conventional cylindrical runner.

According to the injection molded subminiature lens, to which the hot runner according to the embodiment of the present invention has been applied, since the primary sprue, the primary runner, and the secondary sprue are hot runner portions which are maintained in a molten state, the flow characteristics can be improved by maintaining the primary sprue, the primary runner, and the secondary sprue in a molten state. The cooling time can be shortened because the primary sprue, the primary runner, and the secondary sprue do not have to be cooled.

According to the injection molded subminiature lens, to which the hot runner according to the embodiment of the present invention has been applied, the lower end of the secondary sprue is located at every second point between two adjacent cavities of the plurality of cavities. Therefore, the flow balance among all cavities can be achieved by using the simpler manifold structure and smaller number of nozzles 300 than that of cavities 600. Also, a lens of which the number is the same as that of cavities 600 can be molded.

According to the injection molded subminiature lens, to which the hot runner according to the embodiment of the present invention has been applied, the lower end of the secondary sprue is disposed between two adjacent cavities of the plurality of cavities. Therefore, the flow distance of the resin is reduced, and thus, the moldability can be enhanced.

According to the injection molded subminiature lens, to which the hot runner according to the embodiment of the present invention has been applied, the other end of the secondary sprue is positioned corresponding closely to each of the cavities. Therefore, time required for the resin to reach the cavity 600 is shortened, so that the process time can be reduced and the moldability improvement by the reduction of the flow distance can be further increased.

DESCRIPTION OF DRAWINGS

FIG. 1 is a perspective view of a conventional injection-molded subminiature lens having cylindrical runners;

FIG. 2 is a perspective view for describing a delivery system of the conventional subminiature lens for injection molding;

FIG. 3 shows a manifold structure of a conventional hot runner injection mold;

FIG. 4 shows an example of conventional hot runner molding;

FIG. 5 is a perspective view showing an injection molded product to which the conventional hot runner has been applied with a combination of cold runner;

FIG. 6 is a perspective view showing an injection molded subminiature lens, to which a hot runner according to a first embodiment of the present invention has been applied;

FIG. 7 is a conceptual view showing an actual flow path of molten polymer resin for the lens injection molding shown in FIG. 6;

FIG. 8 is a perspective view showing an injection molded subminiature lens, to which a hot runner according to a second embodiment of the present invention has been applied;

FIG. 9 is a conceptual view showing an actual flow path of molten polymer resin for the lens injection molding shown in FIG. 8;

FIG. 10 is a perspective view showing an injection molded subminiature lens, to which a hot runner according to a third embodiment of the present invention has been applied;

FIG. 11 is a conceptual view showing an actual flow path of molten polymer resin for the lens injection molding shown in FIG. 10;

FIG. 12 is a conceptual view of a hot runner applied three-plate injection mold for molding the subminiature lenses, to which the hot runner according to the embodiment has been applied;

FIG. 13 is a perspective view showing an injection molded subminiature lens, to which a hot runner according to a fourth embodiment of the present invention has been applied;

FIG. 14 is a conceptual view showing an actual flow path of molten polymer resin for the lens injection molding shown in FIG. 13;

FIG. 15 is a perspective view showing an injection molded subminiature lens, to which a hot runner according to a fifth embodiment of the present invention has been applied;

FIG. 16 is a conceptual view showing an actual flow path of molten polymer resin for the lens injection molding shown in FIG. 15;

FIG. 17 is a perspective view showing an injection molded subminiature lens, to which a hot runner according to a sixth embodiment of the present invention has been applied; and FIG. 18 is a conceptual view showing an actual flow path of molten polymer resin for the lens injection molding shown in FIG. 17.

MODE FOR INVENTION

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

First Embodiment

FIG. 6 is a perspective view showing an injection molded subminiature lens, to which a hot runner according to a first embodiment of the present invention has been applied. FIG. 7 is a conceptual view showing an actual flow path of molten polymer resin for the lens injection molding shown in FIG. 6.

Referring to FIGS. 6 and 7, the injection molded subminiature lens 10, to which the hot runner according to the first embodiment of the present invention has been applied may include a primary sprue 100, a primary runner 250, a secondary sprue 350, a secondary runner 400, a gate 500, and a cavity 600. Here, a portion of the primary sprue 100 is located within a resin injection point (not shown). The remaining portion of the primary sprue 100 and the primary runner 250 are located within a manifold 200, and the secondary sprue 350 is located within a nozzle 300.

The manifold 200 includes a central portion 210 connected to the resin injection point into which the molten polymer resin is injected and an extension portion 220 radially extending from the central portion 210. The manifold 200 includes a first delivery system capable of forming a portion of the primary sprue 100, and a second delivery system which is connected to the first delivery system and forms the primary runner 250. Within the manifold 200, the primary sprue 100 and the primary runner 250 are maintained in a molten state. A central portion 260 of the primary runner 250 is connected to the primary sprue 100, and the primary runner 250 has an extension portion 270 extending radially from the central portion 260. Here, the number of the extension portions 270 of the primary runner 250 may be, as shown in FIG. 7, four, i.e., ½ of the number of the cavities 600. For example, the extension portions 270 of the primary runner 250 may be equally spaced apart from each other at an angle of 90°.

One end of the nozzle 300 is connected to the end of the extension portion 220 of the manifold 200 (the end of the second delivery system) to supply the resin to the mold in which the secondary runner 400 is formed. The number of the nozzles 300 may correspond to the number of extension portions 220 of the manifold 200, and a plurality of the nozzles 300 may be provided. Here, the cross sectional area of the other end of the nozzle 300 may be reduced toward the secondary runner 400 such that the secondary runner 400 can be easily separated from the nozzle 300 after the completion of injection molding. The secondary sprue 350 is maintained in the nozzle 300 in a molten state. One end of the secondary sprue 350 is connected to the extension portion 270 of the primary runner 250. A plurality of the secondary sprues 350 may be provided. The number of the secondary sprues 350 may be, as shown in FIG. 7, equal to the number of the extension portions 270 of the primary runner 250. Here, in order to balance the resin supplied to the entire cavity 600, the lower end of the secondary sprue 350 may be located at every second point between two adjacent cavities 600 of the plurality of cavities 600. For example, the lower end of the secondary sprue 350 may be located on a bisector of a straight line passing through the centers of two adjacent cavities 600.

The top surface of the secondary runner 400 is connected to the lower end of the secondary sprue 350. The secondary runner 400 has an annular shape and a thin plate shape. The secondary runner 400 has a plurality of protrusions 420 formed on the outer circumference of a body portion 410. Here, the thickness of the secondary runner 400 may be 2 mm or less. Therefore, the injection molded lens, to which the hot runner according to the first embodiment of the present invention has been applied can reduce the material consumption and the cooling time as compared with a conventional cylindrical runner having a diameter of 2 to 5 mm. Here, the top and bottom surfaces of the secondary runner 400 may be flat.

The gate 500 is connected to the end of the protrusion 420 of the secondary runner 400. A plurality of the gates 500 are provided in response to the number of the protrusions 420 of the secondary runner 400. The gate 500 may have a constant cross sectional area, or the cross sectional area of the gate 500 may be reduced toward the cavity 600 side. Therefore, the injection molded lens, to which the hot runner according to the embodiment of the present invention has been applied can reduce the flow resistance and further reduce the pressure drop during the injection molding process.

The cavity 600 is connected to the plurality of gates 500. A plurality of the cavities 600 are formed in response to the number of the gates 500. Although FIGS. 6 and 7 show that eight cavities 600 are formed, the present invention is not limited thereto. Eight or more cavities 600 or eight or less cavities 600 can also be applied.

A heater terminal portion 710 is used as a terminal connected to a manifold heater 700. The manifold heater 700 is installed inside the manifold 200 and supplies heat to maintain the resin inside the manifold 200 in a molten state. For example, in the injection molded lens, to which the hot runner according to the first embodiment of the present invention has been applied, eight heater terminal portions 710 of which four are formed on one side thereof and four are formed on the other side thereof are used, and four manifold heaters 700 connected to the eight heater terminal portions 710 respectively are used. Here, the manifold heater 700 may be a tubular heater. Further, a nozzle heater (reference numeral 750 in FIG. 12) is installed inside the nozzle 300 and supplies heat to maintain the resin inside the nozzle 300 in a molten state. Here, the nozzle heater 750 may be a coil-type heater. Specifically, the manifold heater 700 supplies heat to maintain the primary sprue 100 and the primary runner 250 in a molten state. The nozzle heater 750 supplies heat to maintain the secondary sprue 350 in a molten state. Accordingly, the primary sprue 100, the primary runner 250, and the secondary sprue 350 are hot runner portions which are maintained in a molten state. The hot runner portions 100, 250, and 350 flow in a liquid state in the mold, and FIG. 7 is a view for showing the flow path of the resin within the mold. Meanwhile, the secondary runner 400 and the gate 500 are cold runner portions. Therefore, the cold runners 400 and 500 and the cavity 600 are solidified without being maintained in a molten state after the injection molding stage.

The primary sprue 100, the primary runner 250, the secondary sprue 350, the secondary runner 400, the gate 500, and the cavity 600 serve as a flow path for molding a lens. Specifically, the resin for injection molding is injected into the primary sprue 100, and the resin injected into the primary sprue 100 passes through the primary runner 250, the secondary sprue 350, the secondary runner 400, and the gate 500, and a lens is molded inside the cavity 600.

As described above, in the injection molded lens 10, to which the hot runner according to the first embodiment of the present invention has been applied, 2n number of lenses can be molded by using n number of nozzles 300. Further, the extension portion 270 of the primary runner 250 is located at the midpoint between the adjacent cavities. Therefore, in the injection molded lens 10, to which the hot runner according to the first embodiment of the present invention has been applied, the flow balance among all cavities can be achieved by using the simpler manifold structure and smaller number of nozzles 300 than that of cavities 600, and a lens of which the number is the same as that of cavities 600 can be molded.

Hereinafter, descriptions of the same parts as those of the above-described injection molded lens 10, to which the hot runner according to the first embodiment of the present invention has been applied will be omitted, and the injection molded lenses 20 to 60 for a lens, to which the hot runner according to second to sixth embodiments is applied will be described.

Second Embodiment

FIG. 8 is a perspective view showing an injection molded subminiature lens, to which a hot runner according to a second embodiment of the present invention has been applied. FIG. 9 is a conceptual view showing an actual flow path of molten polymer resin for the lens injection molding shown in FIG. 8.

Referring to FIG. 8, the manifold 200 of the injection molded subminiature lens, to which the hot runner according to the second embodiment of the present invention has been applied includes the central portion 210 connected to a resin injection point through which the molten polymer resin is injected, and the extension portion 220 which radially extends from the central portion 210 and has an end thereof branching in both directions. The manifold 200 includes a first delivery system capable of forming a portion of the primary sprue 100, and two second delivery systems which are connected to the first delivery system and forms the primary runner 250. Referring to FIG. 9, the number of the extension portions 270 of the primary runner 250 of the injection molded lens 20, to which the hot runner according to the second embodiment of the present invention has been applied is four, i.e., ½ of the number of the cavities 600. Here, the number of the secondary sprues 350 may be eight, which is twice the number of the extension portions 270 of the primary runner 250. Specifically, the end of the extension portion 270 of the primary runner 250 branches in both directions and has two sub-ends, and one end of the secondary sprue 350 may be connected to the sub-end. Also, the other end of the secondary sprue 350 is located between two adjacent cavities of the plurality of cavities 600. Here, the sub-end is formed by branching the end into two ends.

For example, in the injection molded lens, to which the hot runner according to the second embodiment of the present invention has been applied may use sixteen heater terminal portions 710 of which four are formed in each of four directions, and eight manifold heaters 700 connected to the sixteen heater terminal portions 710 respectively.

As described above, in the injection molded lens 20, to which the hot runner according to the second embodiment of the present invention has been applied, since the number of the extension portions 270 of the primary runner 250 is equal to the number of the cavities 600, the flow distance of the resin is reduced, and thus, the moldability can be enhanced.

Third Embodiment

FIG. 10 is a perspective view showing an injection molded subminiature lens, to which a hot runner according to a third embodiment of the present invention has been applied. FIG. 11 is a conceptual view showing an actual flow path of molten polymer resin for the lens injection molding shown in FIG. 10.

Referring to FIG. 10, the manifold 200 of the injection molded subminiature lens, to which the hot runner according to the third embodiment of the present invention has been applied includes the central portion 210 connected to a resin injection point through which the molten polymer resin is injected, and the extension portion 220 which radially extends from the central portion 210 and has an end thereof branching in both directions. The manifold 200 includes a first delivery system capable of forming a portion of the primary sprue 100, and two second delivery systems which are connected to the first delivery system and forms the primary runner 250. Referring to FIG. 11, the number of the extension portions 270 of the primary runner 250 of the injection molded lens 30, to which the hot runner according to the third embodiment of the present invention has been applied is four, i.e., ½ of the number of the cavities 600. Here, the number of the secondary sprues 350 may be eight, which is twice the number of the extension portions 270 of the primary runner 250. Specifically, the end of the extension portion 270 of the primary runner 250 branches in both directions and has two sub-ends, and one end of the secondary sprue 350 may be connected to the sub-end. Also, the other end of the secondary sprue 350 is positioned correspondingly closely to each of the cavities 600. For example, the secondary sprue 350 is located on a straight line connecting the center of one closest cavity 600 and the center of the farthest cavity 600.

For example, in the injection molded lens, to which the hot runner according to the third embodiment of the present invention has been applied may use sixteen heater terminal portions 710 of which four are formed in each of four directions, and eight manifold heaters 700 connected to the sixteen heater terminal portions 710 respectively.

As described above, in the injection molded lens 30, to which the hot runner according to the third embodiment of the present invention has been applied, the number of the extension portions 270 of the primary runner 250 is equal to the number of the cavities 600, and the lower end of the secondary sprue 350 is positioned corresponding closely to each of the cavities 600. Therefore, time required for the resin to reach the cavity 600 is shortened, so that the process time can be reduced and the moldability improvement by the reduction of the flow distance can be further increased.

Fourth Embodiment

FIG. 13 is a perspective view showing an injection molded subminiature lens, to which a hot runner according to a fourth embodiment of the present invention has been applied. FIG. 14 is a conceptual view showing an actual flow path of molten polymer resin for the lens injection molding shown in FIG. 13.

Referring to FIG. 13, the manifold 200 of the injection molded subminiature lens 40, to which the hot runner according to the fourth embodiment of the present invention has been applied includes the central portion 210 connected to a resin injection point through which the molten polymer resin is injected, and the extension portion 220 which radially extends from the central portion 210. The manifold 200 includes a first delivery system capable of forming a portion of the primary sprue 100, and a second delivery system which is connected to the first delivery system and forms the primary runner 250. Referring to FIG. 14, the number of the extension portions 270 of the primary runner 250 of the injection molded lens 40, to which the hot runner according to the fourth embodiment of the present invention has been applied is four, i.e., ½ of the number of the cavities 600. For example, the extension portions 270 of the primary runner 250 may be equally spaced apart from each other at an angle of 90°. Here, the number of the secondary sprues 350 may be equal to the number of the extension portions 270 of the primary runner 250. In addition, the lower end of the secondary sprue 350 may be located at every second point between two adjacent cavities 600 of the plurality of cavities 600, For example, the lower end of the secondary sprue 350 may be located on a bisector of a straight line passing through the centers of two adjacent cavities 600.

The top surface of the secondary runner 400 is connected to the lower end of the secondary sprue 350. The secondary runner 400 has a polygonal shape and a thin plate shape. The secondary runner 400 has a plurality of protrusions 420 formed on the outer circumference of a body portion 410. Here, the thickness of the secondary runner 400 may be 2 mm or less. Therefore, the injection molded lens 40, to which the hot runner according to the fourth embodiment of the present invention has been applied can reduce the material consumption and the cooling time as compared with a conventional cylindrical runner having a diameter of 2 to 5 mm. Here, the top and bottom surfaces of the secondary runner 400 may be flat. While FIGS. 13 and 14 show that the secondary runner 400 has an octagonal shape, this is merely an example and is not necessarily limited to the octagonal shape. The secondary runner can have various polygonal shapes as long as the balance of the resin supplied to the plurality of cavities 600 can be achieved.

For example, in the injection molded lens 40, to which the hot runner according to the fourth embodiment of the present invention has been applied, eight heater terminal portions 710 of which four are formed on one side thereof and four are formed on the other side thereof are used, and four manifold heaters 700 connected to the eight heater terminal portions 710 respectively are used.

As described above, in the injection molded lens 40, to which the hot runner according to the fourth embodiment of the present invention has been applied, 2n number of lenses can be molded by using n number of nozzles 300. Further, the extension portion 270 of the primary runner 250 is located at the midpoint between the adjacent cavities 600. Therefore, in the injection molded lens 40, to which the hot runner according to the fourth embodiment of the present invention has been applied, the flow balance among all cavities 600 can be achieved by using the simpler manifold structure and smaller number of nozzles 300 than that of cavities 600, and a lens of which the number is the same as that of cavities 600 can be molded.

Fifth Embodiment

FIG. 15 is a perspective view showing an injection molded subminiature lens, to which a hot runner according to a fifth embodiment of the present invention has been applied. FIG. 16 is a conceptual view showing an actual flow path of molten polymer resin for the lens injection molding shown in FIG. 15.

Referring to FIG. 15, the manifold 200 of the injection molded subminiature lens 50, to which the hot runner according to the fifth embodiment of the present invention has been applied includes the central portion 210 connected to a resin injection point through which the molten polymer resin is injected, and the extension portion 220 which radially extends from the central portion 210 and has an end thereof branching in both directions. The manifold 200 includes a first delivery system capable of forming a portion of the primary sprue 100, and two second delivery systems which are connected to the first delivery system and forms the primary runner 250. Referring to FIG. 16, the number of the extension portions 270 of the primary runner 250 of the injection molded lens 50, to which the hot runner according to the fifth embodiment of the present invention has been applied is four, i.e., ½ of the number of the cavities 600. Here, the number of the secondary sprues 350 may be eight, which is twice the number of the extension portions 270 of the primary runner 250. Specifically, the end of the extension portion 270 of the primary runner 250 branches in both directions and has two sub-ends, and one end of the secondary sprue 350 may be connected to the sub-end. Also, the other end of the secondary sprue 350 is located between two adjacent cavities of the plurality of cavities 600. Here, the sub-end is formed by branching the end into two ends.

The top surface of the secondary runner 400 is connected to the lower end of the secondary sprue 350. The secondary runner 400 has a polygonal shape and a thin plate shape. The secondary runner 400 has a plurality of protrusions 420 formed on the outer circumference of a body portion 410. Here, the thickness of the secondary runner 400 may be 2 mm or less. Therefore, the injection molded lens 50, to which the hot runner according to the fifth embodiment of the present invention has been applied can reduce the material consumption and the cooling time as compared with a conventional cylindrical runner having a diameter of 2 to 5 mm. Here, the top and bottom surfaces of the secondary runner 400 may be flat.

For example, in the injection molded lens 50, to which the hot runner according to the fifth embodiment of the present invention has been applied may use sixteen heater terminal portions 710 of which four are formed in each of four directions, and eight manifold heaters 700 connected to the sixteen heater terminal portions 710 respectively.

As described above, in the injection molded lens 50, to which the hot runner according to the fifth embodiment of the present invention has been applied, since the number of the extension portions 270 of the primary runner 250 and the number of the cavities 600 are the same, the injection molding product 50 to which the hot runner according to the fifth embodiment is applied, so that the moldability can be improved.

Sixth Embodiment

FIG. 17 is a perspective view showing an injection molded subminiature lens, to which a hot runner according to a sixth embodiment of the present invention has been applied. FIG. 18 is a conceptual view showing an actual flow path of molten polymer resin for the lens injection molding shown in FIG. 17.

Referring to FIG. 17, the manifold 200 of the injection molded subminiature lens 60, to which the hot runner according to the sixth embodiment of the present invention has been applied includes the central portion 210 connected to a resin injection point through which the molten polymer resin is injected, and the extension portion 220 which radially extends from the central portion 210 and has an end thereof branching in both directions. The manifold 200 includes a first delivery system capable of forming a portion of the primary sprue 100, and two second delivery systems which are connected to the first delivery system and forms the primary runner 250. Referring to FIG. 18, the number of the extension portions 270 of the primary runner 250 of the injection molded lens 60, to which the hot runner according to the sixth embodiment of the present invention is four, i.e., ½ of the number of the cavities 600. Here, the number of the secondary sprues 350 may be eight, which is twice the number of the extension portions 270 of the primary runner 250. Specifically, the end of the extension portion 270 of the primary runner 250 branches in both directions and has two sub-ends, and one end of the secondary sprue 350 may be connected to the sub-end. Also, the other end of the secondary sprue 350 is positioned corresponding closely to each of the cavities 600. For example, the secondary sprue 350 is located on a straight line connecting the center of one closest cavity 600 and the center of the farthest cavity 600.

The top surface of the secondary runner 400 is connected to the lower end of the secondary sprue 350. The secondary runner 400 has a polygonal shape and a thin plate shape. The secondary runner 400 has a plurality of protrusions 420 formed on the outer circumference of a body portion 410. Here, the thickness of the secondary runner 400 may be 2 mm or less. Therefore, the injection molded lens 60 for a lens, to which the hot runner according to the sixth embodiment of the present invention has been applied can reduce the material consumption and the cooling time as compared with a conventional cylindrical runner having a diameter of 2 to 5 mm. Here, the top and bottom surfaces of the secondary runner 400 may be flat.

For example, in the injection molded lens 60, to which the hot runner according to the sixth embodiment of the present invention has been applied may use sixteen heater terminal portions 710 of which four are formed in each of four directions, and eight manifold heaters 700 connected to the sixteen heater terminal portions 710 respectively.

As described above, in the injection molded lens 60, to which the hot runner according to the sixth embodiment of the present invention has been applied, the number of the extension portions 270 of the primary runner 250 is equal to the number of the cavities 600, and the lower end of the secondary sprue 350 is positioned corresponding closely to each of the cavities 600. Therefore, time required for the resin to reach the cavity 600 is shortened, so that the process time can be reduced and the moldability improvement by the reduction of the flow distance can be further increased.

Here, the position of the secondary sprue 350 and the number of the secondary sprues 350 of the injection molded lens, to which the hot runner according to the embodiment of the present invention has been applied are not necessarily limited to those shown in FIGS. 6 to 11 and FIGS. 13 to 18. That is, the number and position of the secondary sprue 350 can be changed as long as the balance of the resin supplied to the plurality of cavities 600 can be achieved.

As described above, since the secondary runner 400 has an annular shape or a polygonal shape and a thin plate shape, the injection molded lens, to which the hot runner according to the embodiment of the present invention has been applied can reduce the material consumption as compared with the conventional cylindrical runner and can shorten the time required for the secondary runner 400 to be solidified. As a result, additional cooling time after the completion of solidification of the lens is reduced, so that the productivity can be further improved than the conventional cylindrical runner.

In the injection molded lens, to which the hot runner according to the embodiment of the present invention has been applied, since the primary sprue 100, the primary runner 250, and the secondary sprue 350 are hot runner portions which are maintained in a molten state, the flow characteristics can be improved by maintaining the primary sprue 100, the primary runner 250, and the secondary sprue 350 in a molten state. The cooling time can be further shortened than the cooling time required for cooling the primary sprue 100, the primary runner 250, and the secondary sprue 350 because the primary sprue 100, the primary runner 250, and the secondary sprue 350 do not have to be cooled.

FIG. 12 is a conceptual view of a hot runner applied three-plate injection mold for forming the injection molded lens, to which the hot runner according to the embodiment has been applied. Specifically, with reference to the center line of FIG. 12, the left side is the front view thereof and the right side is the cross sectional view thereof.

Referring to FIGS. 6 and 12, the three-plate injection mold for forming the injection molded lens, to which the hot runner according to the embodiment has been applied, includes the resin injection point 1100, the manifold 200, the nozzle 300, the manifold heater 700, the nozzle heater 750, a plurality of ejector pins 800, a plurality of pin cores 900, and an ejector plate 1000.

The descriptions of the resin injection point 1100, the manifold 200, the nozzle 300, the manifold heater 700, and the nozzle heater 750 will be omitted because they are the same as those described above.

The plurality of ejector pins 800 are disposed on one side of the mold in which the secondary runner 400 is formed and serve to push the secondary runner 400 formed by the injected resin toward the cavity 600.

The cavity 600 is formed on the plurality of pin cores 900.

A head portion 850 of the ejector pin 800 and a head portion 950 of the pin core 900 are inserted into the ejector plate 1000. Therefore, the ejector pin 800 and the pin core 900 are fixed by the ejector plate 1000.

In the three-plate injection mold for molding the subminiature lens, to which the hot runner according to the embodiment has been applied, the primary sprue 100, the primary runner 250, and the secondary sprue 350 are maintained in a molten state by applying a three-plate mold structure, and a plurality of lenses are molded by constituting the secondary runner 400 having an annular shape or a polygonal shape and a thin plate shape at the lower end of the secondary sprue 350. Therefore, after the injection molding stage, the primary sprue 100, the primary runner 250, and the secondary sprue 350 remain within the mold in the molten state, and the secondary runner 400 having an annular shape or a polygonal shape and a thin plate shape, the gate 500, and the cavity 600 are ejected out of the mold in a solidified state.

In the above description and drawings, it has been described that eight cavities 600 are provided. However, this is for the convenience of description and better understanding of the present invention, and the present invention is not limited to this. Similar configurations including 12 or 16 cavities, etc., can be also applied to the injection molded lens, to which the hot runner according to the embodiment of the present invention has been applied.

While the present invention has been described with reference to embodiments thereof, it will be understood by those skilled in the art that various changes and modification in forms and details may be made without departing from the spirit and scope of the present invention as defined by the appended claims. The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

The invention claimed is:

1. An injection molding apparatus, to which a hot runner is applied, the injection molding apparatus comprising:
    a primary sprue;
    a primary runner which has a central portion connected to the primary sprue and an extension portion extending radially from the central portion;
    a secondary sprue of which one end is connected to the extension portion of the primary runner;
    a secondary runner which has a top thereof connected to another end of the secondary sprue, has an annular shape which has a center hole and a thin plate shape, and has a plurality of protrusions formed on an outer circumference thereof;
    a plurality of gates which are connected to ends of the plurality of protrusions of the secondary runner and are located on a same plane with the secondary runner; and
    a plurality of cavities connected to the plurality of gates.

2. The injection molding apparatus of claim 1, wherein the primary sprue, the primary runner, and the secondary sprue are hot runner portions which are maintained in a molten state, and wherein the secondary runner and the plurality of gates are cold runner portions.

3. The injection molding apparatus of claim 1,
    wherein a number of the extension portions of the primary runner is ½ of a number of the cavities,
    and wherein the other end of the secondary sprue is located at every second point between two adjacent cavities of the plurality of cavities.

4. The injection molding apparatus of claim 1,
    wherein a number of the extension portions of the primary runner is ½ of a number of the cavities,
    wherein an end of the extension portion of the primary runner branches in both directions and has two sub-ends,
    wherein the one end of the secondary sprue is connected to the sub-end,
    and wherein the other end of the secondary sprue is located between two adjacent cavities of the plurality of cavities.

5. The injection molding apparatus of claim 1,
    wherein a number of the extension portions of the primary runner is ½ of a number of the cavities,
    wherein an end of the extension portion of the primary runner branches in both directions and has two sub-ends,
    wherein the one end of the secondary sprue is connected to the sub-end,
    and wherein the other end of the secondary sprue is positioned corresponding closely to each of the plurality of cavities.

6. The injection molding apparatus of claim 1, wherein the top of the secondary runner connected to the other end of the secondary sprue has the annular shape.

7. An injection molding apparatus, to which a hot runner is applied, the injection molding apparatus comprising:
    a primary sprue;
    a primary runner which has a central portion connected to the primary sprue and an extension portion extending radially from the central portion;
    a secondary sprue of which one end is connected to the extension portion of the primary runner;
    a secondary runner which has a top thereof connected to another end of the secondary sprue, has a polygonal shape which has a center hole with corresponding polygonal shape and a thin plate shape, and has a plurality of protrusions formed on an outer circumference thereof;

a plurality of gates which are connected to ends of the plurality of protrusions of the secondary runner and are located on a same plane with the secondary runner; and a plurality of cavities connected to the plurality of gates.

8. The injection molding apparatus of claim 7, wherein the primary sprue, the primary runner, and the secondary sprue are hot runner portions which are maintained in a molten state, and wherein the secondary runner and the plurality of gates are cold runner portions.

9. The injection molding apparatus of claim 7, wherein a number of the extension portions of the primary runner is ½ of a number of the cavities, and wherein the other end of the secondary sprue is located at every second point between two adjacent cavities of the plurality of cavities.

10. The injection molding apparatus of claim 7, wherein a number of the extension portions of the primary runner is ½ of a number of the cavities, wherein an end of the extension portion of the primary runner branches in both directions and has two sub-ends, wherein the one end of the secondary sprue is connected to the sub-end, and wherein the other end of the secondary sprue is located between two adjacent cavities of the plurality of cavities.

11. The injection molding apparatus of claim 7, wherein a number of the extension portions of the primary runner is ½ of a number of the cavities, wherein an end of the extension portion of the primary runner branches in both directions and has two sub-ends, wherein the one end of the secondary sprue is connected to the sub-end, and wherein the other end of the secondary sprue is positioned corresponding to each of the plurality of cavities.

12. The injection molding apparatus of claim 7, wherein the top of the secondary runner connected to the other end of the secondary sprue has the polygonal shape.

* * * * *